US012760214B2

(12) United States Patent
He et al.

(10) Patent No.: US 12,760,214 B2
(45) Date of Patent: Oct. 13, 2026

(54) VISCOELASTIC FOAM SYSTEM FOR ACIDIC GAS SWITCH, AND METHOD AND USE FOR IMPROVING THE RECOVERY FACTOR USING THE SAME

(71) Applicants: CHINA PETROLEUM & CHEMICAL CORPORATION, Beijing (CN); SINOPEC (SHANGHAI) RESEARCH INSTITUTE OF PETROCHEMICAL TECHNOLOGY CO., LTD., Shanghai (CN)

(72) Inventors: Xiujuan He, Shanghai (CN); Yingcheng Li, Shanghai (CN); Jun Qiu, Shanghai (CN); Leyu Cui, Shanghai (CN)

(73) Assignees: CHINA PETROLEUM & CHEMICAL CORPORATION, Beijing (CN); SINOPEC (SHANGHAI) RESEARCH INSTITUTE OF PETROCHEMICAL TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/879,468

(22) PCT Filed: Jun. 27, 2023

(86) PCT No.: PCT/CN2023/102636

§ 371 (c)(1),
(2) Date: Dec. 27, 2024

(87) PCT Pub. No.: WO2024/002048

PCT Pub. Date: Jan. 4, 2024

(65) Prior Publication Data

US 2026/0042955 A1 Feb. 12, 2026

(30) Foreign Application Priority Data

Jun. 27, 2022 (CN) ........................ 202210735805.5

(51) Int. Cl.
*C09K 8/584* (2006.01)
*C09K 8/594* (2006.01)
(Continued)

(52) U.S. Cl.
CPC .............. *C09K 8/584* (2013.01); *C09K 8/594* (2013.01); *C09K 2208/30* (2013.01)

(58) Field of Classification Search
CPC .... C09K 8/584; C09K 2208/30; C09K 8/594; C09K 8/602; C09K 8/68; C09K 8/60; E21B 43/16
See application file for complete search history.

(56) References Cited

U.S. PATENT DOCUMENTS

2005/0020454 A1* 1/2005 Francini .................. C09K 8/72 507/203
2007/0107897 A1 5/2007 Dahanayake et al.
(Continued)

FOREIGN PATENT DOCUMENTS

CN 1167500 A 12/1997
CN 106350052 A 1/2017
(Continued)

OTHER PUBLICATIONS

Zhang, Panfeng et al., "Enhanced CO2 foam based on amide and amine surfactants and synergistically coupled with sodium dodecyl sulfate at high temperature and high pressure", Journal of Petroleum Science and Engineering, Apr. 22, 2019, vol. 179, No. 02, pp. 266-275.

(Continued)

*Primary Examiner* — Zakiya W Bates
(74) *Attorney, Agent, or Firm* — NKL Law; Allen Xue

(57) ABSTRACT

A viscoelastic foam system for an acidic gas switch improves the recovery factor. The viscoelastic foam system for an acidic gas switch has a pH-switch surfactant, a hydrocarbyl anionic surfactant and water. The pH-switch surfactant is at least one of long-chain hydrocarbyl amines. After the viscoelastic foam system meets the acidic gas, the interaction between the pH-switch surfactant and the hydrocarbyl anionic surfactant is enhanced, the viscosity increases, and the formed foam has better stability and plugging performance. When the viscoelastic foam system is injected at 1.0 PV, the apparent viscosity of the foam formed in the rock core is ≥270 mPa·s, which can increase the recovery factor by more than 20%, and the long-chain hydrocarbyl amine improves the salt tolerance of the single (Continued)

anionic surfactant, so that the applicable mineralization range of the system is increased to 10-200 g/L.

19 Claims, 1 Drawing Sheet

(51) Int. Cl.

| | |
|---|---|
| ***E21B 43/16*** | (2006.01) |
| ***E21B 43/22*** | (2006.01) |

(56) References Cited

U.S. PATENT DOCUMENTS

| | | | |
|---|---|---|---|
| 2015/0190772 | A1 | 7/2015 | Jessop et al. |
| 2018/0119003 | A1 | 5/2018 | Eluru et al. |

FOREIGN PATENT DOCUMENTS

| | | | |
|---|---|---|---|
| CN | 107674665 | A | 2/2018 |
| CN | 108101794 | A | 6/2018 |
| CN | 108659808 | A | 10/2018 |
| CN | 109679609 | A | 4/2019 |
| CN | 109679615 | A | 4/2019 |
| CN | 109679617 | A | 4/2019 |
| CN | 109679631 | A | 4/2019 |
| CN | 112694884 | A | 4/2021 |
| WO | 2015135777 | A2 | 9/2015 |

OTHER PUBLICATIONS

Aiye, Ba, "Study on the preparation of salt-tolerant CO2-responsive foaming agent", China Equipment Engineering, Apr. 10, 2022, pp. 13-114.

Sun, Shuangqing et al., "CO2/N2 switchable aqueous foam stabilized by SDS/C12A surfactants: Experimental and molecular simulation studies", Chemical Engineering Science, Sep. 9, 2019, vol. 209, pp. 1-9.

* cited by examiner

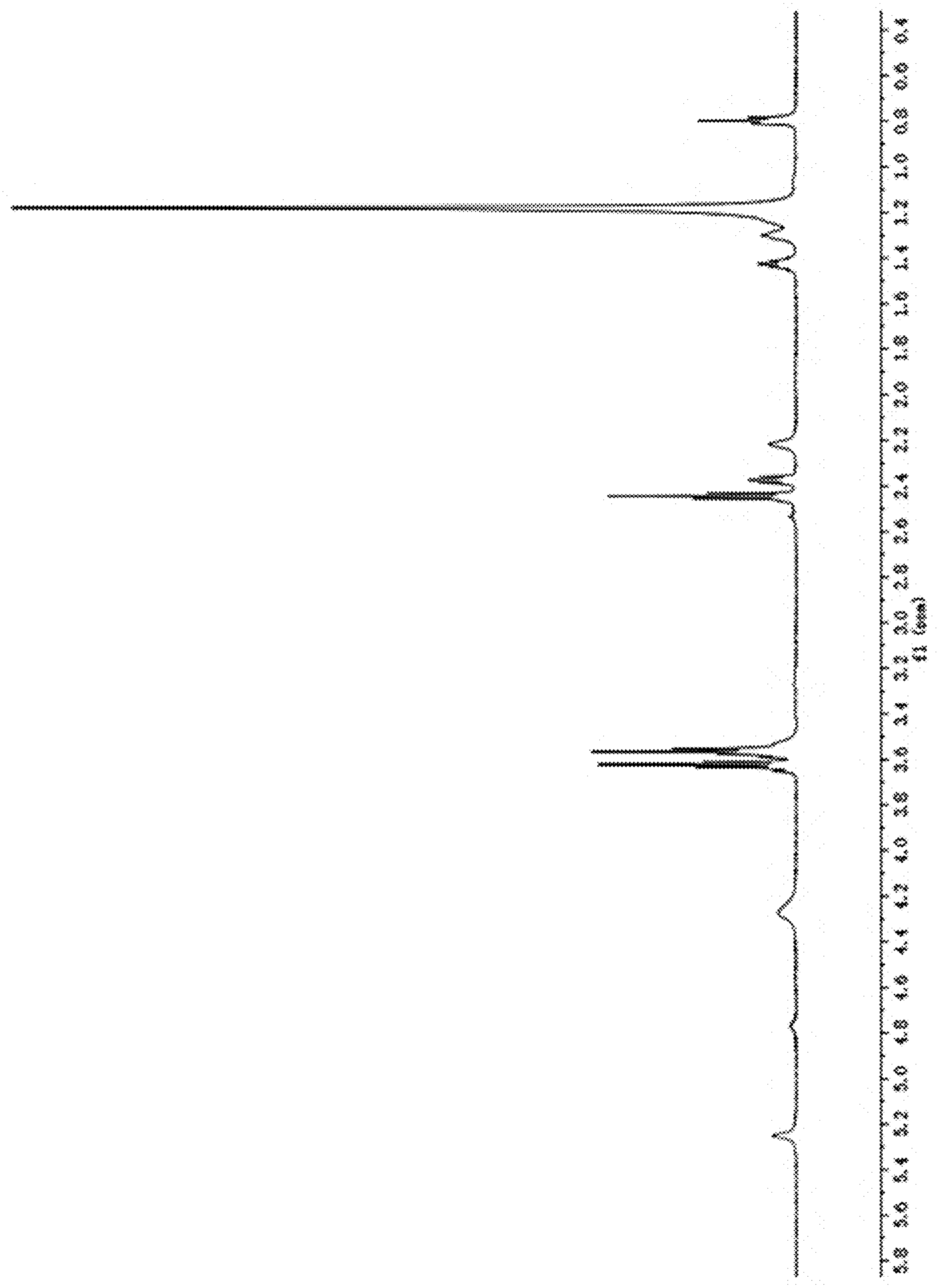
f1 (ppm)

VISCOELASTIC FOAM SYSTEM FOR ACIDIC GAS SWITCH, AND METHOD AND USE FOR IMPROVING THE RECOVERY FACTOR USING THE SAME

TECHNICAL FIELD

The present invention relates to the technical field of enhanced oil recovery, and in particular to a viscoelastic foam system for an acidic gas switch and a method and use of using the same to improve the recovery factor.

BACKGROUND OF ART

Foam is a dispersed system formed by insoluble or slightly soluble gas dispersed in the liquid phase. The gas in the foam used for enhanced oil recovery is usually steam, nitrogen, natural gas or $CO_2$, and the liquid phase is usually an aqueous solution. Foam is a thermodynamically unstable system. After the foam is formed, the liquid within it gradually drains due to gravity and capillary force, and the liquid film becomes thinner. The disjoining pressure between the liquid films and viscosity delay the thinning of the liquid film. While the liquid film becomes thinner, the gas will also diffuse from small bubbles to large bubbles through the liquid film, making the small bubbles smaller and smaller until they disappear, and the large bubbles larger and larger until they burst.

Foreign countries have been conducting technical research on foam control of gas fluidity since the 1970s. The anionic surfactant sodium α-olefin sulfonate is most commonly used because the negative charges between its anions repel each other, enhancing the liquid film separation pressure and making the foam less likely to become thinner and break. The disadvantage of sodium α-olefin sulfonate as a foaming agent is the intermolecular anionic charge repulsion, which makes its saturated adsorption capacity low. The CMC in aqueous solution is as high as several hundred to several thousand mg/L. It has poor anti-dilution ability and insufficient resistance to multivalent ions such as calcium and magnesium. When the calcium ion concentration reaches 200 mg/L, precipitation is likely to occur, and the foaming and foam stabilizing abilities drop sharply.

In order to improve the salt resistance of the system, anionic surfactants alkyl polyether ammonium sulfate and alkyl polyether carboxylates are often used. However, when acidic gases such as $CO_2$ are used as gas sources, they dissolve in aqueous solution, causing the pH to drop significantly. Carboxylates are prone to form carboxylic acids, affecting their solubility in aqueous solution. Ammonium sulfate salts are hydrolyzed, and the structural stability is reduced under acidic conditions. Therefore, there is a need for a foam system suitable for use in acidic gas conditions.

SUMMARY OF THE INVENTION

The present inventors have found in their research that when nonionic surfactants (such as alkylamine or alkyl alcoholamine polyether surfactants) are compounded with anionic surfactants, good foaming performance cannot be obtained after compounding due to the low ionization degree of the nonionic surfactants; while when anionic-nonionic surfactants (such as alkylamine or alkyl alcoholamine polyether carboxylate or sulfonate surfactants) are compounded with anionic surfactants, although their ionization degree is high and they can be used as foaming agents after compounding, the anionic groups they possess repel each other with the anionic surfactants, and therefore, the compounded system does not have a viscosity-increasing effect on the system.

The present inventors have found through further research that by introducing a polyamine structure into a nonionic surfactant while maintaining the nonionic structure at its polyether end, under the action of an acidic substance, the protonation degree and hydrophilic-lipophilic balance of the compounding with an anionic surfactant can be well achieved, which not only has excellent foaming performance but also has good viscosity-increasing effect on the system, thus completing the present invention.

In order to solve the problems existing in the prior art, the present invention provides a viscoelastic foam system for an acidic gas switch and a method and use for improving the recovery factor using the same. The viscoelastic foam system of the present invention comprises a pH-switch surfactant, a hydrocarbyl anionic surfactant and water; the pH-switch surfactant is at least one of long-chain hydrocarbyl amines. The present invention utilizes the characteristic of acidic gas to adjust pH, designs a method for improving the recovery factor with a viscoelastic foam system for an acidic gas switch, and adjusts/controls unfavorable factors to advantageous factors, thereby achieving the purpose of improving the recovery factor. Acidic gases can improve the interaction between surfactants, thus although the injected surfactants have low viscosity under neutral conditions, after meeting with acidic gases, the interaction is enhanced, the viscosity increases, and the formed foam has better stability and plugging performance.

One of the objects of the present invention is to provide a viscoelastic foam system for an acidic gas switch.

The viscoelastic foam system for an acidic gas switch comprises a pH-switch surfactant, a hydrocarbyl anionic surfactant and water; the pH-switch surfactant is at least one of long-chain hydrocarbyl amines; the structure of the long-chain hydrocarbyl amine is represented by formula (1):

formula (1)

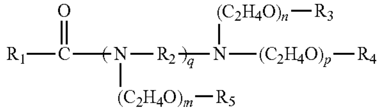

wherein $R_1$ is selected from $C_{11}$-$C_{24}$ aliphatic hydrocarbyl; $R_2$ is selected from $C_1$-$C_5$ aliphatic hydrocarbyl; $R_3$, $R_4$ and $R_5$ are each independently selected from H, an aliphatic $C_1$-$C_3$ hydrocarbyl or a substituted aliphatic $C_1$-$C_3$ hydrocarbyl;

m+n+p is 0-30, q is 1 or 2.

In a preferable embodiment of the present invention, the pH-switch surfactant is at least two of long-chain hydrocarbyl amines;

$R_1$ is preferably selected from $C_{11}$-$C_{20}$ aliphatic hydrocarbyl; $R_2$ is preferably selected from $C_1$-$C_3$ aliphatic hydrocarbyl; $R_3$, $R_4$ and $R_5$ are preferably each independently selected from H, $C_1$-$C_3$ aliphatic hydrocarbyl;

preferably m+n+p is 0-6, wherein, m, n and p are each independently an arbitrary number of 0-10, preferably an arbitrary number of 0-2; the arbitrary number is preferably an arbitrary integral.

When m, n or p is 0, the corresponding $R_3$, $R_4$ or $R_5$ is directly connected to N.

In the present invention, the term "long-chain hydrocarbyl" refers to a saturated or unsaturated aliphatic hydrocarbyl having 11 or more carbon atoms.

The long-chain hydrocarbyl amine of formula (1) described above may be a commercially available product from the prior art. It can also be prepared by the reaction method of the prior art. The preparation method preferably comprises:

a fatty acid

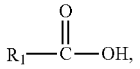

thionyl chloride and N,N-dimethylformamide are reacted at 70-100° C. for 2-5 hours, and the excess thionyl chloride is removed under reduced pressure to obtain a fatty acid chloride

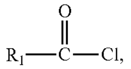

wherein $R_1$ in the fatty acid is a $C_{11}$-$C_{24}$ aliphatic hydrocarbyl. The obtained fatty acid chloride is mixed with toluene, and a mixture of amine and pyridine in the required ratio is added dropwise at 60-90° C., and the mixture is reacted for 2-5 hours. After post-treatment, a product having the structural formula (1) is obtained.

The molar ratio of the above fatty acid, thionyl chloride and N,N-dimethylformamide is 1:(1.0-2.0):(0.03-0.1), the volume ratio of fatty acid chloride and toluene is 1:(0.5-1.5), and the molar ratio of fatty acid chloride:amine:pyridine is 1:(1-1.5):(1-2.5).

$R_1$ in the above fatty acid is a $C_{11}$-$C_{24}$ aliphatic hydrocarbyl.

Where there is only one amino group in the above amine, the structure of the amine is

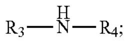

and/or, where there are two or more amino groups in the above amine, the structure of the amine is

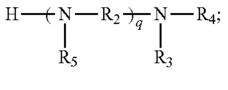

wherein $R_2$ is selected from $C_1$-$C_5$ aliphatic hydrocarbyl; $R_3$, $R_4$ and $R_5$ are each independently selected from H, an aliphatic $C_1$-$C_3$ hydrocarbyl or a substituted aliphatic $C_1$-$C_3$ hydrocarbyl.

The long-chain hydrocarbyl amine obtained from the above amidation reactions:

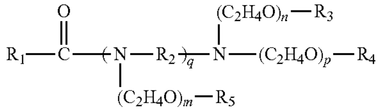

wherein $R_1$ is selected from $C_{11}$-$C_{24}$ aliphatic hydrocarbyl; $R_2$ is selected from $C_1$-$C_5$ aliphatic hydrocarbyl; $R_3$, $R_4$ and $R_5$ are each independently selected from H, an aliphatic $C_1$-$C_3$ hydrocarbyl or a substituted aliphatic $C_1$-$C_3$ hydrocarbyl; m, n and p are all zero.

Where the amine in the raw material has two or more amino groups, in formula (1), q is 1-2.

Furthermore, a preferred embodiment of the long-chain hydrocarbyl amine of the present invention is as follows:

the product of formula (1) obtained by the amidation reaction, when at least one of $R_3$, $R_4$ and $R_5$ is H, can be subjected to an alkoxylation reaction with ethylene oxide (the molar ratio of ethylene oxide to the product of formula (1) is 1-30:1) at a reaction temperature of 80-160° C. and under a pressure of less than 0.60 MPa (gauge pressure) to obtain a long-chain hydrocarbyl amine of the following formula (1):

formula (1)

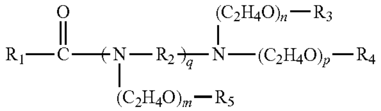

wherein $R_1$ is selected from $C_{11}$-$C_{24}$ aliphatic hydrocarbyl; $R_2$ is selected from $C_1$-$C_5$ aliphatic hydrocarbyl; $R_3$, $R_4$ and $R_5$ are each independently selected from H, an aliphatic $C_1$-$C_3$ hydrocarbyl or a substituted aliphatic $C_1$-$C_3$ hydrocarbyl, and at least one of them is H; m+n+p is 1-30, q is 1-2.

The long-chain hydrocarbyl amine product obtained by the amidation reaction of the raw materials under the conditions described in the above preparation method, or the long-chain alkyl amine product obtained by the alkoxylation reaction after the amidation, can be directly used as the pH-switch surfactant described in the present invention to be applied to the viscoelastic foam system of the present invention.

In a preferable embodiment of the present invention, the hydrocarbyl anionic surfactant is at least one of alkyl carboxylate salt, alkyl sulfate salt, alkyl sulfonate salt, and alkene sulfonate salt; the carbon atom number of the alkyl is preferably 1-20, more preferably 1-12; the carbon atom number of the alkene sulfonate salt is preferably 10-20; the alkene sulfonate salt is preferably an alpha-olefin sulfonate.

In a preferable embodiment of the present invention, the water is a mineral-containing water, preferably at least one of tap water, oil and gas field stratum injection water, and water oil and gas field injection water, more preferably salt water with a mineralization range of 10-200 g/L.

In a preferable embodiment of the present invention, the pH-switch surfactant comprises 0.2-1 wt %; preferably 0.3-0.6 wt % of the viscoelastic foam system;

the hydrocarbyl anionic surfactant comprises 0.05-0.3 wt %; preferably 0.1-0.2 wt % of the viscoelastic foam system;

the mass ratio of the pH-switch surfactant to the hydrocarbyl anionic surfactant is 1:(0.05-15); preferably 1:(0.1-3); more preferably 1:(0.1-0.6);

the foam system allows the formation of a solution viscosity of 3-30 mPa·s under the action of acidic gas;

when the foam system is injected at an amount of 1.0 PV, the apparent viscosity of the foam formed in the highly permeable porous medium is ≥270 mPa·s.

The second object of the present invention is to provide a process for preparing the viscoelastic foam system of the first object of the present invention.

The process for preparing comprises mixing components including a pH switch surfactant, a hydrocarbyl anionic surfactant and water.

The third object of the present invention is to provide a method for improving the recovery factor using the viscoelastic foam system of the first object of the present invention or the viscoelastic foam system prepared by the process of the second object of the present invention.

The process comprises: injecting the viscoelastic foam system and an acidic gas alternately or together into a porous medium containing crude oil, forming foam in situ in the porous medium, thereby improving the recovery factor.

The viscoelastic foam system of the present invention forms viscoelastic foam under the action of acidic gas, thereby expanding the sweep coefficient/conformance efficiency of the displacement phase, thereby increasing the recovery factor of the displaced phase, that is, crude oil, and the recovery factor can be increased by more than 20%.

In a preferable embodiment of the present invention, the acidic gas is at least one of $CO_2$ and $H_2S$.

In a preferable embodiment of the present invention, the volume ratio or the volume flow rate ratio of the acidic gas to the viscoelastic foam system is 1:(0.1-2).

The fourth object of the present invention is to provide use of a viscoelastic foam system according to the first object of the present invention or a viscoelastic foam system prepared by the process according to the second object of the present invention in the oil recovery from an oil reservoir having a mineralization degree of 10-200 g/L.

The present invention has the following advantages: The present invention makes full use of the advantage of acidic gas in changing the pH. Under the action of acidic gas, the nonionic amine of long-chain hydrocarbyl amine is converted into quaternary ammonium with partial positive charge. There is electrostatic attraction between the quaternary ammonium and the anionic surfactant, which is easy to form relatively large micelles, thereby increasing the viscosity of the system.

The thinning equation of the foam film is:

$$-\frac{dX_F}{dt} = 2C_f \Delta P X_F^3 / 3\mu R_F^2$$

in the above equation, μ is a liquid viscosity, $R_F$ is a curvature radius of the foam film surface, $C_f$ is a correction factor, and ΔP is a pressure difference between the pressure in the Plateau border (P zone) and the disjoining pressure.

It can be seen from the above equation that the increase in viscosity can delay the liquid drainage from the foam film and stabilize the foam.

The increase in liquid film viscosity can reduce the diffusion rate of gas through the liquid film, making the foam more stable.

In the meanwhile, the long-chain hydrocarbyl amine improves the salt resistance of the single anionic surfactant, so that the applicable mineralization range of the system is increased to 10-200 g/L.

The present invention further provides the following technical solutions:

1. A viscoelastic foam system for an acidic gas switch, comprising a pH-switch surfactant, a hydrocarbyl anionic surfactant and water; the pH-switch surfactant is at least one of long-chain hydrocarbyl amines;

wherein the long-chain hydrocarbyl amine is a long-chain hydrocarbyl polyamine compound, the polyamine compound has two or more non-cyclic amine moieties, preferably 2-10 non-cyclic amine moieties, for example, 2, 3, 4, 5, 6, 7, 8, 9 or 10 non-cyclic amine moieties, and the long-chain hydrocarbyl is a saturated or unsaturated aliphatic hydrocarbyl having 11 or more carbon atoms, preferably a $C_{11}$-$C_{24}$ aliphatic hydrocarbyl;

the polyamine compound is composed of a main body and a non-main body, nitrogen atoms of said two or more non-cyclic amine moieties, atom(s) or chemical group(s) (for example $C_1$-$C_5$ aliphatic hydrocarbyl) used to connect nitrogen atoms of non-cyclic amine moieties, and hydrogen atoms directly connected to nitrogen atoms of non-cyclic amine moieties constitute the main part of the polyamine compound, other atom(s) or chemical group(s) connected to nitrogen atoms of the non-cyclic amine moieties constitute the non-main body of the polyamine compound;

nitrogen atoms of the non-cyclic amine moieties are present in the form of tertiary amine, and primary amine and/or secondary amine (preferably, the tertiary amine comprises 30-100%, e.g. 50%-100%, 90%-100%, or 100% of the total of the primary amine, the secondary amine and the tertiary amine, on the basis of nitrogen atoms);

the non-main part of the polyamine compound includes or consists of the following (2) and/or (3), and (1):

(1) at least one, preferably one long-chain hydrocarbyl such as $C_{11}$-$C_{24}$ aliphatic hydrocarbyl connected directly or via a linking group to the nitrogen atom of non-cyclic amine moiety, more preferably, the long-chain hydrocarbyl such as $C_{11}$-$C_{24}$ aliphatic hydrocarbyl is connected directly or via a carbonyl group (—CO—) to the nitrogen atom of non-cyclic amine moiety; and (2) at least one $C_1$-$C_3$ aliphatic hydrocarbyl or substituted $C_1$-$C_3$ aliphatic hydrocarbyl directly connected to the nitrogen atom of the non-cyclic amine moiety; and/or (3) at least one —($C_2$-$C_3$alkyl-O—)$_s$—$R_s$ directly connected to the nitrogen atom of the non-cyclic amine moiety, s is 1-60, for example 1-6, or 1-4, or 1-3, or 1-2, $R_s$ is H or an aliphatic $C_1$-$C_3$ hydrocarbyl or a substituted aliphatic $C_1$-$C_3$ hydrocarbyl, —($C_2$-$C_3$alkyl-O—)$_s$—$R_s$, e.g. —$(C_2H_4O)_s$H, s is defined as above;

the non-main body of the polyamine compound, e.g. at the end of the non-main body of the polyamine compound, does not include ionic group(s), e.g. acid group(s) (e.g. sulfonic acid group, carboxylic acid group, phosphoric acid group, and phosphonic acid group) or salt group(s) (e.g. sulfonate group and carboxylate group, e.g. sodium sulfonate) or quaternary ammonium base group(s) (e.g. betaine and derivatives thereof, e.g. alkyl betaine, alkylamido betaine, sulfopropyl betaine, hydroxy sulfopropyl betaine, and betaine phosphate).

In the above technical solution, the total of the number of (2) at least one $C_1$-$C_3$ aliphatic hydrocarbyl or substituted $C_1$-$C_3$ aliphatic hydrocarbyl directly connected to the nitrogen atom of the non-cyclic amine moiety and the number of (3) at least one —($C_2$-$C_3$alkyl-O—)$_s$—$R_s$ directly connected to the nitrogen atom of the non-cyclic amine moiety is not more than the twice of the number of the amine moieties of the polyamine compound minus one. As non-ionic groups, (2) at least one $C_1$-$C_3$ aliphatic hydrocarbyl or substituted $C_1$-$C_3$ aliphatic hydrocarbyl directly connected to the nitrogen atom of the non-cyclic amine moiety and (3) at least one-($C_2$-$C_3$alkyl-O—)$_s$—$R_s$ directly connected to the nitrogen atom of the non-cyclic amine moiety can be protonated by the action of acidic gas or water.

2. A viscoelastic foam system for an acidic gas switch, which comprises a pH-switch surfactant, a hydrocarbyl anionic surfactant and water; the pH-switch surfactant is at least one of long-chain hydrocarbyl amines; the structure of the long-chain hydrocarbyl amine is represented by formula (1) or formula (Ia) or formula (Ib) or formula (Ic):

(I)

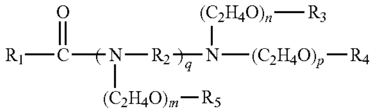

(Ia)

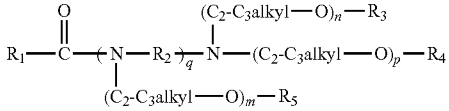

(Ib)

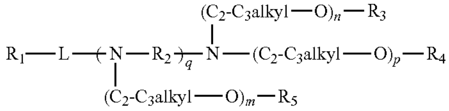

(Ic)

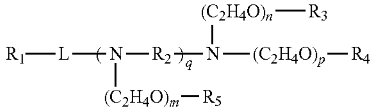

wherein $R_1$ is each independently selected from $C_{11}$-$C_{24}$ aliphatic hydrocarbyl; $R_2$ is each independently selected from $C_1$-$C_5$ aliphatic hydrocarbyl; $R_3$, $R_4$ and $R_5$ are each independently selected from H, an aliphatic $C_1$-$C_3$ hydrocarbyl or a substituted aliphatic $C_1$-$C_3$ hydrocarbyl;

m+n+p is 0-30, q is 1 or 2;

L is each independently a chemical bond or a bivalent linking group, preferably the bivalent linking group is selected from: —CO—, —CO—NH—, —CO—NH—CO—, —CO—NH—COO—, —CO—NH—OCO—, —COO—, —COO—NH—, —COO—NH—CO—, —COO—NH—COO—, —NHCO—, —NHCONH—, —NHCOO—, —NHOCO—, —OCONH—, —OCO—NH—CO—, —OCO—NH—OCO—, —OCOO—, —O—$SO_2$—, —$SO_2$— and —O—.

3. The viscoelastic foam system according to technical solution 1, wherein the pH-switch surfactant is at least two of long-chain hydrocarbyl amines.

4. The viscoelastic foam system according to any one technical solutions 2-3, wherein $R_1$ is selected from $C_{11}$-$C_{20}$ aliphatic hydrocarbyl; $R_2$ is selected from $C_1$-$C_3$ aliphatic hydrocarbyl; $R_3$, $R_4$ and $R_5$ are each independently selected from H, $C_1$-$C_3$ aliphatic hydrocarbyl; preferably m+n+p is 0-6.

5. The viscoelastic foam system according to any one technical solutions 2-4, wherein $R_1$ is selected from $C_{11}$-$C_{20}$ aliphatic hydrocarbyl; $R_2$ is selected from $C_1$-$C_3$ aliphatic hydrocarbyl; $R_3$, $R_4$ and $R_5$ are each independently selected from H, $C_1$-$C_3$ aliphatic hydrocarbyl; preferably m+n+p is 0-6 excluding 0, preferably m, n and p all are nonnegative integer.

6. The viscoelastic foam system according to any one technical solutions 2-5, wherein $R_1$ is selected from $C_{11}$-$C_{24}$ aliphatic hydrocarbyl; $R_2$ is selected from $C_1$-$C_5$ aliphatic hydrocarbyl; $R_3$, $R_4$ and $R_5$ are each independently selected from H, an aliphatic $C_1$-$C_3$ hydrocarbyl or a substituted aliphatic $C_1$-$C_3$ hydrocarbyl, and at least one of them is H;

m+n+p is 1-30, q is 1-2.

7. The viscoelastic foam system according to any one technical solutions 1-6, wherein the hydrocarbyl anionic surfactant is at least one of alkyl carboxylate salt, alkyl sulfate salt, alkyl sulfonate salt, and alkene sulfonate salt;

the carbon atom number of the alkyl is preferably 1-20, more preferably 1-12; and/or, the carbon atom number of the alkene sulfonate salt is preferably 10-20.

8. The viscoelastic foam system according to any one technical solutions 1-7, wherein the water is a mineral-containing water, preferably at least one of tap water, oil and gas field stratum injection water, and water oil and gas field injection water, more preferably salt water with a mineralization range of 10-200 g/L.

9. The viscoelastic foam system according to any one technical solutions 1-8, wherein the pH-switch surfactant comprises 0.2-1 wt %; preferably 0.3-0.6 wt % of the viscoelastic foam system; the hydrocarbyl anionic surfactant comprises 0.05-0.3 wt %; preferably 0.1-0.2 wt % of the viscoelastic foam system;

the mass ratio of the pH-switch surfactant to the hydrocarbyl anionic surfactant is 1:(0.05-15); preferably 1:(0.1-3);

the foam system allows the formation of a solution viscosity of 3-30 mPa·s under the action of acidic gas.

10. A process for preparing the viscoelastic foam system according to any one of technical solutions 1-9, comprising mixing components including a pH switch surfactant, a hydrocarbyl anionic surfactant and water.

11. A method for improving the recovery factor using a viscoelastic foam system according to any one of technical solutions 1-9 or a viscoelastic foam system prepared according to technical solution 10, comprising injecting the viscoelastic foam system and an acidic gas alternately or together into a porous medium containing crude oil, forming foam in situ in the porous medium, thereby improving the recovery factor.

12. The method according to technical solution 11, wherein the acidic gas is at least one of $CO_2$ and $H_2S$.

13. The method according to technical solution 11, wherein the volume ratio or the volume flow rate ratio of the acidic gas to the viscoelastic foam system is 1:(0.1-2).

14. Use of the viscoelastic foam system according to any one of technical solutions 1-9 or the viscoelastic foam system prepared according to technical solution 10 in the oil recovery from an oil reservoir with a mineralization degree of 10-200 g/L.

15. A combination product for in-situ foam formation, comprising:

(1) a viscoelastic foam system package; and (2) an acidic material package;

wherein the viscoelastic foam system package contains the viscoelastic foam system according to any one of technical solutions 1-9 or the viscoelastic foam system prepared according to technical solution 10;

the acidic material package contains an acidic liquid (such as carbonic acid, acetic acid, propionic acid and butyric acid) or an acidic gas (preferably $CO_2$ and $H_2S$), the acidic gas is present in the form of compressed gas, and the pressure of the acidic liquid or acidic gas in the acidic material package is 0.1-30 MPaG.

16. The combination product for in-situ foam formation according to technical solution 15, comprising:

a means for controlling the viscoelastic foam system package to output a viscoelastic foam system; and a means for controlling the acidic material package to output the acidic material, so that the ratio of the volume flow rate of the acidic material output from the acidic material package to the volume flow rate of the viscoelastic foam system output from the viscoelastic foam system package is 1:(0.1-10), e.g. 1:(0.5-2);

preferably, the sum of the volume flow rate of the acidic material output from the acidic material package and the volume flow rate of the viscoelastic foam system output from the viscoelastic foam system package is 0.2-200 mL/min, for example, 0.5-10.0 mL/min, or 1-4 mL/min, e.g. 2 mL/min, and/or, the pressure of the acidic material output from the acidic material package is 0.1-30 MPaG;

the pressure of the viscoelastic foam system output from the viscoelastic foam system package is 0.1-30 MPaG.

17. The combination product for in-situ foam formation according to technical solution 15 or 16, wherein:

the acidic material in the acidic material package is $CO_2$, a system obtained by saturating the viscoelastic foam system in the viscoelastic foam system package with the acidic material in the acidic material package at normal temperature and 0.1 MPa has a viscosity of 3-30 mPa·s, and the solution surface of the system has an elasticity modulus of at least 30 mN/m, e.g. 30-90 mN/m, e.g. 30-60 mN/m, a viscosity module of at least 10 mN/m, e.g. 13-23 mN/m, a phase angle of 10-30°, e.g. 18-26°.

18. Use of the combination product for in-situ foam formation according to any one of technical solutions 15-17 in the oil recovery from an oil reservoir having a mineralization degree of 10-200 g/L, preferably, the foam formed from the combination product has an apparent viscosity of 200-400 mPa·s, e.g. 250-360 mPa·s, e.g. 270-353 mPa·s.

19. A combination product for in-situ foam formation, comprising:

(1a) a pH-switch surfactant package, containing the pH-switch surfactant according to any one of technical solutions 1-9, and optionally water;

(1b) a hydrocarbyl anionic surfactant package, containing the hydrocarbyl anionic surfactant according to any one of technical solutions 1-9, and optionally water;

or (1) a surfactant package, containing the pH-switch surfactant and the hydrocarbyl anionic surfactant according to any one of technical solutions 1-9, and optionally water;

the combination product further comprises: (2) an acidic material package, the acidic material package contains an acidic liquid (such as carbonic acid, acetic acid, propionic acid and butyric acid) or an acidic gas (preferably $CO_2$ and $H_2S$), the acidic gas is present in the form of compressed gas, and the pressure of the acidic liquid or acidic gas in the acidic material package is 0.1-30 MPaG.

20. The combination product for in-situ foam formation according to technical solution 19, which comprises:

a means for controlling the introduction of an optional external water;

a means for controlling the pH-switch surfactant package and the hydrocarbyl anionic surfactant package to output the pH-switch surfactant (and optionally water) and the hydrocarbyl anionic surfactant (and optionally water) respectively; or a means for controlling the surfactant package to output the pH-switch surfactant and the hydrocarbyl anionic surfactant (and optionally water);

a means for mixing the output pH-switch surfactant (and optionally water) and the output hydrocarbyl anionic surfactant (and optionally water), and the optionally introduced external water; or optionally, a means for mixing the output pH-switch surfactant and hydrocarbyl anionic surfactant (and optionally water), and the optionally introduced external water; and a means for controlling the acidic material package to output the acidic material, so that:

the components including the pH-switch surfactant, the hydrocarbyl anionic surfactant and water are mixed to form a viscoelastic foam system, wherein water is from the external water, water in the above-mentioned package(s), or both;

preferably, the pH-switch surfactant comprises 0.2-1 wt %, e.g. 0.3-0.6 wt % of the viscoelastic foam system; the hydrocarbyl anionic surfactant comprises 0.05-0.3 wt %, e.g. 0.1-0.2 wt % of the viscoelastic foam system; the mass ratio of the pH-switch surfactant to the hydrocarbyl anionic surfactant is 1:(0.05-15), e.g. 1:(0.1-3); and the ratio of the volume flow rate of the acidic material output from the acidic material package to the volume flow rate of the formed viscoelastic foam system is 1:(0.1-10), e.g. 1:(0.5-2);

preferably, the sum of the volume flow rate of the acidic material output from the acidic material package and the volume flow rate of the formed viscoelastic foam system is 0.2-200 mL/min, for example, 0.5-10.0 mL/min, or 1-4 mL/min, e.g. 2 mL/min, and/or, the pressure of the acidic material output from the acidic material package is 0.1-30 MPaG; the pressure of the formed viscoelastic foam system is 0.1-30 MPaG.

21. The combination product for in-situ foam formation according to technical solution 20, wherein:

the acidic material in the acidic material package is $CO_2$, a system obtained by saturating the formed viscoelastic foam system with the acidic material in the acidic material package at normal temperature and 0.1 MPa has a viscosity of 3-30 mPa·s, and the solution surface of the system has an elasticity modulus of at least 30 mN/m, e.g. 30-90 mN/m, e.g. 30-60 mN/m, a viscosity module of at least 10 mN/m, e.g. 13-23 mN/m, a phase angle of 10-30°, e.g. 18-26°.

22. Use of the combination product for in-situ foam formation according to any one of technical solutions 19-21 in the oil recovery from an oil reservoir having a mineralization degree of 10-200 g/L, preferably, the foam formed from the combination product has an apparent viscosity of 200-400 mPa·s, e.g. 250-360 mPa·s, e.g. 270-353 mPa·s.

DESCRIPTION OF THE DRAWINGS

The FIGURE is an H NMR spectrum of a long-chain hydrocarbyl amine of the present invention.

DETAILED DESCRIPTION

In the present invention, unless otherwise specified, aliphatic hydrocarbyl refer to aliphatic alkyl and alkenyl groups, particularly straight-chain or branched-chain alkyl groups and straight-chain or branched-chain alkenyl groups, and the carbon atom number of the aliphatic hydrocarbyl can be 1-30, e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30.

In the present invention, unless otherwise specified, the substituted aliphatic hydrocarbyl refers to a substituted aliphatic hydrocarbyl, wherein the substituent may be halogen (—F, —Cl, —Br, —I), hydroxyl (—OH), mercapto (—SH), cyano (—CN), nitro (—$NO_2$), ethynyl (—C≡CH), preferably hydroxyl.

In the present invention, unless otherwise specified, the non-cyclic amine moiety refer to such NH3 wherein one or two hydrogen atoms in NH3 are substituted by atoms or chemical groups of the non-main body, and the other hydrogen atoms may be unsubstituted or substituted by non-hydrogen atoms or chemical groups of the main body (e.g., $C_1$-$C_5$ aliphatic hydrocarbyl) and, if necessary, further connected to nitrogen atom(s) of other non-cyclic amine moiety(ies).

For example, as shown in the following formula, the moiety in the frame is the main body, which includes q+1 nitrogen atoms; and the leftmost $R_1$—CO— moiety, the rightmost —$(C_2H_4O)_n$—$R_3$ moiety and —$(C_2H_4O)_p$—$R_4$ moiety, and the below q —$(C_2H_4O)_m$—$R_5$ moieties constitute the non-main body:

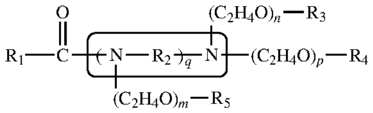

In the above example, the total number of the number of at least one $C_1$-$C_3$ aliphatic hydrocarbyl or substituted $C_1$-$C_3$ aliphatic hydrocarbyl directly connected to the nitrogen atom of the non-cyclic amine moiety and the number of at least one —($C_2$-$C_3$alkyl-O—$)_s$—$R_s$ directly connected to the nitrogen atom of the non-cyclic amine moiety is q+2, the number of amine moieties is q+1, and the two satisfy the following relationship: (q+2)≤(q+1)×2−1=2q+1.

In the present invention, in order to synthesize the long-chain hydrocarbyl amine, it is necessary to introduce a linking group (usually divalent) well known in the art during the synthesis process, including but not limited to —CO—, —CO—NH—, —CO—NH—CO—, —CO—NH—COO—, —CO—NH—OCO—, —COO—, —COO—NH—, —COO—NH—CO—, —COO—NH—COO—, —NHCO—, —NHCONH—, —NHCOO—, —NHOCO—, —OCONH—, —OCO—NH—CO—, —OCO—NH—OCO—, —OCOO—, —O—$SO_2$—, —$SO_2$— and —O—. For example, in the reaction of fatty acid chloride ($C_{11}H_{23}COCl$) and propylene diamine, a polyamine compound with a —CO—NH— bond and HCl are formed, wherein —CO— is a well-known linking group. Since the raw material "alkyl-COCl" is easier to be obtained than the raw material "alkyl-Cl", those skilled in the art prefer to use the raw material having a linking group "alkyl-COCl".

In the present invention, the viscosity of the foam system that is saturated with 0.1 MPa $CO_2$ at room temperature is measured in the following manner: the apparent viscosity of the sample is measured at a shear rate of 7.34 $s^{-1}$ by using a HAAKE MARS III-Type rheometer of Thermo Scientific Company with the coaxial cylinder measuring rotor having a diameter of 41 mm.

In the present invention, an interfacial rheometer is used to measure the elastic modulus, viscosity module and phase angle of the solution surface of the carbon dioxide/foam system obtained after the foam system is saturated with 0.1 MPa $CO_2$ at normal temperature in the following manner: the TRACKER interfacial dilation rheometer produced by I. T. CONCEPT of France is used, the oscillation period is 10 s, and the test temperature is normal temperature (25° C.).

In the present invention, the apparent viscosity of the foam formed in the oil recovery from an oil reservoir having a mineralization degree of 10-200 g/L is measured in the following manner: A sample of rock core is vacuumized and weighed, then saturated with water and weighed, and the pore volume PV=Δm/ρ is calculated according to the weight difference, where ρ is 1.0 g/$cm^3$. The water phase permeability k is measured. Then, the sample is saturated with liquid paraffin (analytical grade, obtained from Sinopharm Group, where liquid paraffin is used to simulate crude oil) until no water flows out, and then the core sample is placed for 1 month to be aged; the aged core sample is displaced with a saline having a mineralization degree of 10-200 g/L until no liquid paraffin flows out, and then the sample is displaced by injecting the viscoelastic foam system and $CO_2$ together, the volume flow rate ratio of $CO_2$ to the viscoelastic foam system is 1:(0.5-2), the total injection rate of the viscoelastic foam system and $CO_2$ is 2 mL/min, the pressure difference ΔP between front and back ends is measured and recorded when the injection amount of the viscoelastic foam system is 1.0 PV, and the apparent viscosity $\mu_{app}$ of the foam formed in the rock core is calculated.

$$\mu_{app} = \frac{kA\Delta P}{(Q_L + Q_g)L}$$

wherein A is the cross-sectional area of the sample rock core, which is 4.91 $cm^2$ used in the present invention, L is the length of the sample rock core, which is 30 cm used in the present invention, and $Q_L$ and $Q_g$ are the volume flow rates of the liquid phase and the gas phase, respectively.

The present invention is described in detail below in conjunction with specific embodiments. It is necessary to point out that the following examples are only used to further illustrate the present invention and cannot be understood as limiting the scope of protection of the present invention. Some non-essential improvements and adjustments to the present invention made by those skilled in the art based on the contents of the present invention still fall within the scope of protection of the present invention.

The raw materials used in examples are all conventional commercially available raw materials.

Example 1

Preparation of a pH-Switch Surfactant:

(1) 200 g (1.0 mol) of dodecanoic acid, 149 g (1.25 mol) of thionyl chloride and 3 g (0.04 mol) of N,N-dimethylformamide (DMF) were added to a four-necked flask equipped with a sealed mechanical stirrer, a thermometer and a condenser. After reacting at 90° C. for 3 hours, the excess thionyl chloride was evaporated under reduced pressure to obtain fatty acid chloride ($C_{11}H_{23}COCl$). When the temperature dropped to 60° C., 70 g of toluene was added. After stirring evenly, a mixed solution consisting of 74 g (1.0 mol) of propylene diamine and 99.0 g (1.25 mol) of pyridine was slowly added dropwise. The temperature was controlled to be less than 60° C. After the dropwise addition was completed, the temperature was raised to 85° C. and the reaction was carried out for 2 hours. After cooling and filtering, the crude product was recrystallized with ethanol, and dried in vacuum to obtain a white powder solid ($C_{11}H_{23}CONHC_3H_6NH_2$) with a total yield of 90%.

(2) 128 g (0.5 mol) of the above white powder solid was added to a reactor equipped with a condensing device, a stirring device and a gas disperser, and heated to 80-90° C. A vacuum system was turned on. Dehydration was carried out under high vacuum for 1 hour, and then nitrogen purging was carried out for 3-4 times to remove the air in the system. Then, the reaction temperature of the system was adjusted to 130° C., and 88 g (2 mol) of ethylene oxide was slowly introduced, and the pressure was controlled to be less than 0.60 MPa to carry out an alkoxylation reaction. After the reaction was completed, nitrogen purging was carried out to remove the unreacted ethylene oxide, and after cooling, the system was neutralized, decolorized, filtered and dehydrated to obtain a long-chain hydrocarbyl amine 1A with a yield of 93%.

Structure of the Long-Chain Hydrocarbyl Amine 1A:

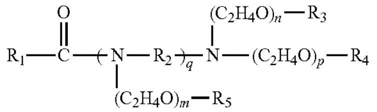

$R_1 = C_{11}H_{23}$, $R_2 = C_3H_6$, $R_3, R_4, R_5 = H$, $m + n + p = 4$, $q = 1$.

The fatty acid raw material was replaced with tetradecanoic acid, hexadecanoic acid and octadecanoic acid respectively and reacted under the above conditions to obtain a long-chain hydrocarbyl amine 1B, a long-chain hydrocarbyl amine 1C and a long-chain hydrocarbyl amine 1D.

$R_{1S}$ in the structures of the long-chain hydrocarbyl amine 1B, the long-chain hydrocarbyl amine 1C and the long-chain hydrocarbyl amine 1D are $C_{13}H_{27}$, $C_{15}H_{31}$ and $C_{17}H_{35}$ respectively, and the other parts are the same as those of the long-chain hydrocarbyl amine 1A.

The pH-switch surfactant used in the viscoelastic foam system of Example 1 was a mixture of the long-chain hydrocarbyl amines 1A, 1B, 1C and 1D with the molar ratio of 0.067:0.059:0.316:0.569.

The H-NMR spectrum of the long-chain hydrocarbyl amine 1A is shown in the FIGURE. 1B, 1C and 1D have similar H-NMR spectra to 1A.

Preparation of a Viscoelastic Foam System:

At normal temperature and at atmospheric pressure, 0.5 g of the pH-switch surfactant and 0.1 g of sodium decyl sulfonate (TCI) were added into a saline with a mineralization degree of 50 g/L, and mixed to obtain 100 g of a viscoelastic foam system.

At normal temperature, the viscosity of the viscoelastic foam system could reach 5 mPa·s after saturation with 0.1 MPa $CO_2$. The solution surface of the carbon dioxide/foam system was tested with an interfacial rheometer to show an elasticity modulus of 30 mN/m, a viscosity module of 15 mN/m, and a phase angle of 26°, indicating that it was a viscoelastic system.

Oil Displacement Experiment with the Viscoelastic Foam System:

A sample of rock core was vacuumized and weighed, then saturated with water and weighed. The pore volume PV was calculated based on the weight difference to be 47.9 mL. The water phase permeability k was determined to be 1045 mD. It was then saturated with liquid paraffin (analytical grade, obtained from Sinopharm Group, where liquid paraffin was used to simulate crude oil, the same below) until no water flowed out, and then the core was placed for 1 month to be aged. The aged core was displaced with a saline with a mineralization degree of 50 g/L until no liquid paraffin flowed out, and the water drive recovery factor was recorded, which was 51%. Then, the aged rock core was displaced by injecting the viscoelastic foam system in Example 1 and $CO_2$ together. The volume flow rate ratio of $CO_2$ to the viscoelastic foam system was 1:2, and the total injection rate of the viscoelastic foam system and $CO_2$ was 2 mL/min. The liquid paraffin recovery factors under the injection amounts of 0.5 PV and 1.0 PV of the viscoelastic foam system were recorded to be 70% and 81% respectively, increasing the recovery factors by 19% and 30%. When the injection amount of the viscoelastic foam system was 1.0 PV, the apparent viscosity of the foam formed in the rock core was 353 mPa·s.

Comparative Example 1

Preparation of a Foam System:

At normal temperature and at atmospheric pressure, 0.6 g of the pH-switch surfactant in Example 1 was added into a saline with a mineralization degree of 50 g/L, and mixed to obtain 100 g of a foam system.

The above foam system was saturated at normal temperature with 0.1 MPa $CO_2$ and then tested for the viscosity, which was close to the viscosity of water, both 1 mPa·s.

Oil Displacement Experiment with the Foam System:

A sample of rock core was vacuumized and weighed, then saturated with water and weighed. The pore volume PV was calculated based on the weight difference to be 47.1 mL. The water phase permeability k was determined to be 1045 mD. It was then saturated with liquid paraffin (analytical grade, obtained from Sinopharm Group) until no water flowed out, and then the rock core was placed for 1 month to be aged. The aged core was displaced with a saline with a mineralization degree of 50 g/L until no liquid paraffin flowed out, and the water drive recovery factor was recorded, which was 50%. Then, the aged rock core was displaced by injecting 0.5% of the foam system in Comparative Example 1 and $CO_2$ together. The volume flow rate ratio of $CO_2$ to the foam system was 1:2, and the total injection rate of the foam system and $CO_2$ was 2 mL/min. The liquid paraffin recovery factors under the injection amounts of 0.5 PV and 1.0 PV of the foam system were recorded to be 60% and 69% respectively, increasing the recovery factors by 10% and 19%.

When the injection amount of the foam system was 1.0 PV, the apparent viscosity of the foam formed in the rock core was 30 mPa·s.

Comparative Example 2

Preparation of a Foam System:

At normal temperature and at atmospheric pressure, 0.6 g of decyl sodium sulfonate in Example 1 was added into a saline with a mineralization degree of 50 g/L, and mixed to obtain 100 g of a foam system. The above foam system was saturated at normal temperature with 0.1 MPa $CO_2$ and then tested for the viscosity, which was close to the viscosity of water, both 1 mPa·s.

Oil Displacement Experiment with the Foam System:

A sample of rock core was vacuumized and weighed, then saturated with water and weighed. The pore volume PV was calculated based on the weight difference to be 47.3 mL. The water phase permeability k was determined to be 999 mD. It was then saturated with liquid paraffin (analytical grade, obtained from Sinopharm Group) until no water flowed out, and then the rock core was placed for 1 month to be aged. The aged core was displaced with a saline with a mineralization degree of 50 g/L until no liquid paraffin flowed out, and the water drive recovery factor was recorded, which was 51%. Then, the aged rock core was displaced by injecting 0.6% of the foam system in Comparative Example 1 and $CO_2$ together. The volume flow rate ratio of $CO_2$ to the foam system was 1:2, and the total injection rate of the foam system and $CO_2$ was 2 mL/min. The liquid paraffin recovery factors under the injection amounts of 0.5 PV and 1.0 PV of the foam system were recorded to be 53% and 56% respectively, increasing the recovery factors by 2% and 5%. When the injection amount of the foam system was 1.0 PV, the apparent viscosity of the foam formed in the rock core was 5 mPa·s.

Example 2

The structure and preparation process of the pH-switch surfactant were the same as those in Example 1.

Preparation of a Viscoelastic Foam System:

At normal temperature and at atmospheric pressure, 0.3 g of the pH-switch surfactant in Example 1 and 0.2 g of sodium ethoxylated alkyl sulfate (Jintung Petrochemical, model: AES, the alkyl carbon number=$C_{12}$-$C_{14}$) were added into a saline with a mineralization degree of 100 g/L, and mixed to obtain 100 g of a viscoelastic foam system.

At normal temperature, the viscosity of the viscoelastic foam system could reach 4 mPa·s after saturation with 0.1 MPa $CO_2$. The solution surface of the carbon dioxide/foam system was tested with an interfacial rheometer to show an elasticity modulus of 40 mN/m, a viscosity module of 13 mN/m, and a phase angle of 18°.

Oil Displacement Experiment with the Viscoelastic Foam System:

A sample of rock core was vacuumized and weighed, then saturated with water and weighed. The pore volume PV was calculated based on the weight difference to be 47.0 mL. The water phase permeability k was determined to be 990 mD. It was then saturated with liquid paraffin (analytical grade, obtained from Sinopharm Group) until no water flowed out, and then the rock core was placed for 1 month to be aged. The aged core was displaced with a saline with a mineralization degree of 100 g/L until no liquid paraffin flowed out, and the water drive recovery factor was recorded, which was 47%. Then, the aged rock core was displaced by injecting the viscoelastic foam system in Example 2 and $CO_2$ together. The volume flow rate ratio of $CO_2$ to the viscoelastic foam system was 1:1, and the total injection rate of the viscoelastic foam system and $CO_2$ was 2 mL/min. The liquid paraffin recovery factors under the injection amounts of 0.5 PV and 1.0 PV of the viscoelastic foam system were recorded to be 64% and 75% respectively, increasing the recovery factors by 17% and 28%. When the injection amount of the viscoelastic foam system was 1.0 PV, the apparent viscosity of the foam formed in the rock core was 301 mPa·s.

Comparative Example 3

Preparation of a Foam System:

At normal temperature and at atmospheric pressure, 0.5 g of sodium ethoxylated alkyl sulfate in Example 2 was added into a saline with a mineralization degree of 100 g/L, and mixed to obtain 100 g of a foam system.

The above foam system was saturated at normal temperature with 0.1 MPa $CO_2$ and then tested for the viscosity, which was close to the viscosity of water, both 1 mPa·s.

Oil Displacement Experiment with the Foam System:

A sample of rock core was vacuumized and weighed, then saturated with water and weighed. The pore volume PV was calculated based on the weight difference to be 47.4 mL. The water phase permeability k was determined to be 1037 mD. It was then saturated with liquid paraffin (analytical grade, obtained from Sinopharm Group) until no water flowed out, and then the rock core was placed for 1 month to be aged. The aged core was displaced with a saline with a mineralization degree of 100 g/L until no liquid paraffin flowed out, and the water drive recovery factor was recorded, which was 50%. Then, the aged rock core was displaced by injecting the foam system in Comparative Example 3 and $CO_2$ together. The volume flow rate ratio of $CO_2$ to the foam system was 1:1, and the total injection rate of the foam system and $CO_2$ was 2 mL/min. The liquid paraffin recovery factors under the injection amounts of 0.5 PV and 1.0 PV of the foam system were recorded to be 56% and 59% respectively, increasing the recovery factors by 6% and 9%. When the injection amount of the foam system was 1.0 PV, the apparent viscosity of the foam formed in the rock core was 5 mPa·s.

Example 3

Preparation of a pH-Switch Surfactant:

(1) 200 g (1.0 mol) of lauric acid, 149 g (1.25 mol) of thionyl chloride and 3 g (0.04 mol) of N,N-dimethylformamide (DMF) were added to a four-necked flask equipped with a sealed mechanical stirrer, a thermometer and a condenser. After reacting at 90° C. for 3 hours, the excess thionyl chloride was evaporated under reduced pressure to obtain fatty acid chloride. When the temperature dropped to 60° C., 70 g of toluene was added. After stirring evenly, a mixed solution consisting of 144 g (1.0 mol) of N,N'-di-n-propyl ethylene diamine and 99.0 g (1.25 mol) of pyridine was slowly added dropwise. The temperature was controlled to be less than 60° C. After the dropwise addition was completed, the temperature was raised to 85° C. and the reaction was carried out for 2 hours. After cooling and filtering, the crude product was recrystallized with ethanol, and dried in vacuum to obtain a white powder solid ($C_{11}H_{23}CONHC_2H_4N(C_3H_7)_2$) with a yield of 91%.

(2) 163 g (0.5 mol) of the above reaction material was added to a reactor equipped with a condensing device, a stirring device and a gas disperser, and heated to 80-90° C.

A vacuum system was turned on. Dehydration was carried out under high vacuum for 1 hour, and then nitrogen purging was carried out for 3-4 times to remove the air in the system. Then, the reaction temperature of the system was adjusted to 130° C., and 22 g (0.5 mol) of ethylene oxide was slowly introduced, and the pressure was controlled to be less than 0.60 MPa to carry out an alkoxylation reaction. After the reaction was completed, nitrogen purging was carried out to remove the unreacted ethylene oxide, and after cooling, the system was neutralized, decolorized, filtered and dehydrated to obtain a pH-switch surfactant, i.e. a long-chain hydrocarbyl amine 2A (having a structure as shown below) with a yield of 92%.

Structure of pH-Switch Surfactant:

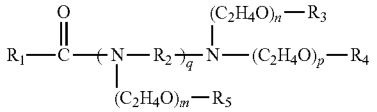

$R_1 = C_{11}H_{23}$; $R_2 = C_2H_4$; $R_3, R_4 = C_3H_7$; $R_5 = H$; m =1, n =0, p = 0, q = 1.

Preparation of a Viscoelastic Foam System:

At normal temperature and at atmospheric pressure, 0.6 g of the pH-switch surfactant in Example 3 and 0.15 g of sodium acetate were added into a saline with a mineralization degree of 10 g/L, and mixed to obtain 100 g of a viscoelastic foam system.

At normal temperature, the viscosity of the viscoelastic foam system could reach 10 mPa·s after saturation with 0.1 MPa $CO_2$. The solution surface of the carbon dioxide/foam system was tested with an interfacial rheometer to show an elasticity modulus of 35 mN/m, a viscosity module of 17 mN/m, and a phase angle of 26°

Oil Displacement Experiment with the Viscoelastic Foam System:

A sample of rock core was vacuumized and weighed, then saturated with water and weighed. The pore volume PV was calculated based on the weight difference to be 47.1 mL. The water phase permeability k was determined to be 1009 mD. It was then saturated with liquid paraffin (analytical grade, obtained from Sinopharm Group) until no water flowed out, and then the rock core was placed for 1 month to be aged. The aged core was displaced with a saline with a mineralization degree of 10 g/L until no liquid paraffin flowed out, and the water drive recovery factor was recorded, which was 53%. Then, the aged rock core was displaced by injecting the viscoelastic foam system in Example 3 and $CO_2$ together. The volume flow rate ratio of $CO_2$ to the viscoelastic foam system was 1:0.5, and the total injection rate of the viscoelastic foam system and $CO_2$ was 2 mL/min. The liquid paraffin recovery factors under the injection amounts of 0.5 PV and 1.0 PV of the viscoelastic foam system were recorded to be 67% and 82% respectively, increasing the recovery factors by 14% and 29%. When the injection amount of the viscoelastic foam system was 1.0 PV, the apparent viscosity of the foam formed in the rock core was 307 mPa·s.

Comparative Example 4

Preparation of a Foam System:

At normal temperature and at atmospheric pressure, 0.75 g of the pH-switch surfactant in Example 3 was added into a saline with a mineralization degree of 10 g/L, and mixed to obtain 100 g of a foam system.

The foam system was saturated at normal temperature with 0.1 MPa $CO_2$ and then tested for the viscosity, which viscosity could reach 2 mPa·s.

Oil Displacement Experiment with the Foam System:

A sample of rock core was vacuumized and weighed, then saturated with water and weighed. The pore volume PV was calculated based on the weight difference to be 47.3 mL. The water phase permeability k was determined to be 1030 mD. It was then saturated with liquid paraffin (analytical grade, obtained from Sinopharm Group) until no water flowed out, and then the rock core was placed for 1 month to be aged. The aged core was displaced with a saline with a mineralization degree of 10 g/L until no liquid paraffin flowed out, and the water drive recovery factor was recorded, which was 54%. Then, the aged rock core was displaced by injecting the foam system in Comparative Example 4 and $CO_2$ together. The volume flow rate ratio of $CO_2$ to the foam system was 1:0.5, and the total injection rate of the foam system and $CO_2$ was 2 mL/min. The liquid paraffin recovery factors under the injection amounts of 0.5 PV and 1.0 PV of the foam system were recorded to be 67% and 74% respectively, increasing the recovery factors by 13% and 20%. When the injection amount of the foam system was 1.0 PV, the apparent viscosity of the foam formed in the rock core was 130 mPa·s.

Comparative Example 5

Preparation of a Foam System:

At normal temperature and at atmospheric pressure, 0.75 g of sodium acetate in Example 3 was added into a saline with a mineralization degree of 10 g/L, and mixed to obtain 100 g of a foam system. The above foam system was saturated at normal temperature with 0.1 MPa $CO_2$ and then tested for the viscosity, which was close to the viscosity of water, both 1 mPa·s.

Oil Displacement Experiment with the Foam System:

A sample of rock core was vacuumized and weighed, then saturated with water and weighed. The pore volume PV was calculated based on the weight difference to be 47.5 mL. The water phase permeability k was determined to be 1021 mD. It was then saturated with liquid paraffin (analytical grade, obtained from Sinopharm Group) until no water flowed out, and then the rock core was placed for 1 month to be aged. The aged core was displaced with a saline with a mineralization degree of 10 g/L until no liquid paraffin flowed out, and the water drive recovery factor was recorded, which was 48%. Then, the aged rock core was displaced by injecting the foam system in Comparative Example 5 and $CO_2$ together. The volume flow rate ratio of $CO_2$ to the foam system was 1:0.5, and the total injection rate of the foam system and $CO_2$ was 2 mL/min. The liquid paraffin recovery factors under the injection amounts of 0.5 PV and 1.0 PV of the foam system were recorded to be 50% and 52% respectively, increasing the recovery factors by 2% and 4%. When the injection amount of the foam system was 1.0 PV, the apparent viscosity of the foam formed in the rock core was 2 mPa·s.

Example 4

The structure and preparation process of the pH-switch surfactant were the same as those in Example 3.

Preparation of a Viscoelastic Foam System:

At normal temperature and at atmospheric pressure, 0.2 g of the pH-switch surfactant in Example 3 and 0.1 g of α-alkenyl sodium sulfonate (Sinolight Chemicals, Model:

AOS/92) were added into a saline with a mineralization degree of 10 g/L, and mixed to obtain 100 g of a viscoelastic foam system. The viscoelastic foam system was saturated at normal temperature with 0.1 MPa $CO_2$ and then tested for the viscosity, which viscosity could reach 3 mPa·s.

Oil Displacement Experiment with the Viscoelastic Foam System:

A sample of rock core was vacuumized and weighed, then saturated with water and weighed. The pore volume PV was calculated based on the weight difference to be 47.4 mL. The water phase permeability k was determined to be 1041 mD. It was then saturated with liquid paraffin (analytical grade, obtained from Sinopharm Group) until no water flowed out, and then the rock core was placed for 1 month to be aged. The aged core was displaced with a saline with a mineralization degree of 10 g/L until no liquid paraffin flowed out, and the water drive recovery factor was recorded, which was 49%. Then, the aged rock core was displaced by injecting the viscoelastic foam system in Example 4 and $CO_2$ together. The volume flow rate ratio of $CO_2$ to the viscoelastic foam system was 1:1.5, and the total injection rate of the viscoelastic foam system and $CO_2$ was 2 mL/min. The liquid paraffin recovery factors under the injection amounts of 0.5 PV and 1.0 PV of the viscoelastic foam system were recorded to be 61% and 71% respectively, increasing the recovery factors by 12% and 22%. When the injection amount of the viscoelastic foam system was 1.0 PV, the apparent viscosity of the foam formed in the rock core was 317 mPa·s.

Comparative Example 6

Preparation of a Foam System:

At normal temperature and at atmospheric pressure, 0.3 g of alkene sodium sulfonate in Example 4 was added into a saline with a mineralization degree of 10 g/L, and mixed to obtain 100 g of a foam system.

The above foam system was saturated at normal temperature with 0.1 MPa $CO_2$ and then tested for the viscosity, which was close to the viscosity of water, both 1 mPa·s.

Oil Displacement Experiment with the Foam System:

A sample of rock core was vacuumized and weighed, then saturated with water and weighed. The pore volume PV was calculated based on the weight difference to be 47.7 mL. The water phase permeability k was determined to be 1038 mD. It was then saturated with liquid paraffin (analytical grade, obtained from Sinopharm Group) until no water flowed out, and then the rock core was placed for 1 month to be aged. The aged core was displaced with a saline with a mineralization degree of 10 g/L until no liquid paraffin flowed out, and the water drive recovery factor was recorded, which was 49%. Then, the aged rock core was displaced by injecting the foam system in Comparative Example 6 and $CO_2$ together. The volume flow rate ratio of $CO_2$ to the foam system was 1:1.5, and the total injection rate of the foam system and $CO_2$ was 2 mL/min. The liquid paraffin recovery factors under the injection amounts of 0.5 PV and 1.0 PV of the foam system were recorded to be 59% and 65% respectively, increasing the recovery factors by 10% and 16%. When the injection amount of the foam system was 1.0 PV, the apparent viscosity of the foam formed in the rock core was 100 mPa·s.

Example 5

Preparation of a pH-Switch Surfactant:

(1) 312 g (1.0 mol) of eicosanoic acid, 149 g (1.25 mol) of thionyl chloride and 3 g (0.04 mol) of N,N-dimethylformamide (DMF) were added to a four-necked flask equipped with a sealed mechanical stirrer, a thermometer and a condenser. After reacting at 90° C. for 3 hours, the excess thionyl chloride was evaporated under reduced pressure to obtain fatty acid chloride. When the temperature dropped to 60° C., 70 g of toluene was added. After stirring evenly, a mixed solution consisting of 131 g (1.0 mol) of dipropylene diamine and 99.0 g (1.25 mol) of pyridine was slowly added dropwise. The temperature was controlled to be less than 60° C. After the dropwise addition was completed, the temperature was raised to 85° C. and the reaction was carried out for 2 hours. After cooling and filtering, the crude product was recrystallized with ethanol, and dried in vacuum to obtain a white powder solid ($C_{19}H_{39}CO(NHC_3H_6)_2NH_2$) with a yield of 89%.

(2) 213 g (0.5 mol) of the above reaction material was added to a reactor equipped with a condensing device, a stirring device and a gas disperser, and heated to 80-90° C. A vacuum system was turned on. Dehydration was carried out under high vacuum for 1 hour, and then nitrogen purging was carried out for 3-4 times to remove the air in the system. Then, the reaction temperature of the system was adjusted to 130° C., and 132 g (3.0 mol) of ethylene oxide was slowly introduced, and the pressure was controlled to be less than 0.60 MPa to carry out an alkoxylation reaction. After the reaction was completed, nitrogen purging was carried out to remove the unreacted ethylene oxide, and after cooling, the system was neutralized, decolorized, filtered and dehydrated to obtain a pH-switch surfactant, i.e. a long-chain hydrocarbyl amine 3 (having a structure as shown below) with a yield of 91%.

Structure of pH-Switch Surfactant:

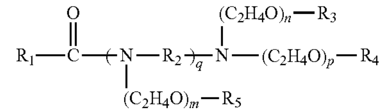

$R_1 = C_{19}H_{39}$, $R_2 = C_3H_6$, $R_3$, $R_4$, $R_5$ = H, m + n + p = 6, q = 2.

Preparation of a Viscoelastic Foam System:

At normal temperature and at atmospheric pressure, 0.4 g of the pH-switch surfactant in Example 5 and 0.1 g of sodium butyl sulfonate were added into a saline with a mineralization degree of 200 g/L, and mixed to obtain 100 g of a viscoelastic foam system.

At normal temperature, the viscosity of the viscoelastic foam system could reach 23 mPa·s after saturation with 0.1 MPa $CO_2$. The solution surface of the carbon dioxide/foam system was tested with an interfacial rheometer to show an elasticity modulus of 60 mN/m, a viscosity module of 23 mN/m, and a phase angle of 21°

Oil Displacement Experiment with the Viscoelastic Foam System:

A sample of rock core was vacuumized and weighed, then saturated with water and weighed. The pore volume PV was calculated based on the weight difference to be 46.8 mL. The water phase permeability k was determined to be 990 mD. It was then saturated with liquid paraffin (analytical grade, obtained from Sinopharm Group) until no water flowed out, and then the rock core was placed for 1 month to be aged. The aged core was displaced with a saline with a mineralization degree of 200 g/L until no liquid paraffin flowed out, and the water drive recovery factor was recorded, which was 45%. Then, the aged rock core was displaced by injecting the viscoelastic foam system in Example 5 and $CO_2$ together. The volume flow rate ratio of $CO_2$ to the viscoelastic foam system was 1:0.5, and the total injection rate of the viscoelastic foam system and $CO_2$ was 2 mL/min. The liquid paraffin recovery factors under the injection amounts of 0.5 PV and 1.0 PV of the viscoelastic foam system were recorded to be 59% and 74% respectively, increasing the recovery factors by 14% and 29%. When the injection amount of the viscoelastic foam system was 1.0 PV, the apparent viscosity of the foam formed in the rock core was 307 mPa·s.

Comparative Example 7

Preparation of a Foam System:

At normal temperature and at atmospheric pressure, 0.5 g of the pH-switch surfactant in Example 5 was added into a saline with a mineralization degree of 200 g/L, and mixed to obtain 100 g of a foam system.

The foam system was saturated at normal temperature with 0.1 MPa $CO_2$ and then tested for the viscosity, which viscosity could reach 2 mPa·s.

Oil Displacement Experiment with the Foam System:

A sample of rock core was vacuumized and weighed, then saturated with water and weighed. The pore volume PV was calculated based on the weight difference to be 47.6 mL. The water phase permeability k was determined to be 1027 mD. It was then saturated with liquid paraffin (analytical grade, obtained from Sinopharm Group) until no water flowed out, and then the rock core was placed for 1 month to be aged. The aged core was displaced with a saline with a mineralization degree of 200 g/L until no liquid paraffin flowed out, and the water drive recovery factor was recorded, which was 44%. Then, the aged rock core was displaced by injecting the foam system in Comparative Example 7 and $CO_2$ together. The volume flow rate ratio of $CO_2$ to the foam system was 1:0.5, and the total injection rate of the foam system and $CO_2$ was 2 mL/min. The liquid paraffin recovery factors under the injection amounts of 0.5 PV and 1.0 PV of the foam system were recorded to be 53% and 62% respectively, increasing the recovery factors by 9% and 18%. When the injection amount of the foam system was 1.0 PV, the apparent viscosity of the foam formed in the rock core was 140 mPa·s.

Example 6

The structure and preparation process of the pH-switch surfactant were the same as those in Example 5.

Preparation of a Viscoelastic Foam System:

At normal temperature and at atmospheric pressure, 0.7 g of the pH-switch surfactant in Example 5 and 0.05 g of sodium butyl sulfonate were added into a saline with a mineralization degree of 200 g/L, and mixed to obtain 100 g of a viscoelastic foam system.

At normal temperature, the viscosity of the viscoelastic foam system could reach 4 mPa·s after saturation with 0.1 MPa $CO_2$. The solution surface of the carbon dioxide/foam system was tested with an interfacial rheometer to show an elasticity modulus of 37 mN/m, a viscosity module of 15 mN/m, and a phase angle of 22°.

Oil Displacement Experiment with the Viscoelastic Foam System:

A sample of rock core was vacuumized and weighed, then saturated with water and weighed. The pore volume PV was calculated based on the weight difference to be 47.0 mL. The water phase permeability k was determined to be 1007 mD. It was then saturated with liquid paraffin (analytical grade, obtained from Sinopharm Group) until no water flowed out, and then the rock core was placed for 1 month to be aged. The aged core was displaced with a saline with a mineralization degree of 200 g/L until no liquid paraffin flowed out, and the water drive recovery factor was recorded, which was 46%. Then, the aged rock core was displaced by injecting the viscoelastic foam system in Example 5 and $CO_2$ together. The volume flow rate ratio of $CO_2$ to the viscoelastic foam system was 1:1.5, and the total injection rate of the viscoelastic foam system and $CO_2$ was 2 mL/min. The liquid paraffin recovery factors under the injection amounts of 0.5 PV and 1.0 PV of the viscoelastic foam system were recorded to be 60% and 69% respectively, increasing the recovery factors by 14% and 23%. When the injection amount of the viscoelastic foam system was 1.0 PV, the apparent viscosity of the foam formed in the rock core was 270 mPa·s.

Comparative Example 8

Preparation of a Foam System:

At normal temperature and at atmospheric pressure, 0.75 g of the sodium butyl sulfonate in Example 5 was added into a saline with a mineralization degree of 200 g/L, and mixed to obtain 100 g of a foam system.

The above foam system was saturated at normal temperature with 0.1 MPa $CO_2$ and then tested for the viscosity, which was close to the viscosity of water, both 1 mPa·s.

Oil Displacement Experiment with the Foam System:

A sample of rock core was vacuumized and weighed, then saturated with water and weighed. The pore volume PV was calculated based on the weight difference to be 47.3 mL. The water phase permeability k was determined to be 1023 mD. It was then saturated with liquid paraffin (analytical grade, obtained from Sinopharm Group) until no water flowed out, and then the rock core was placed for 1 month to be aged. The aged core was displaced with a saline with a mineralization degree of 200 g/L until no liquid paraffin flowed out, and the water drive recovery factor was recorded, which was 46%. Then, the aged rock core was displaced by injecting the foam system in Comparative Example 8 and $CO_2$ together. The volume flow rate ratio of $CO_2$ to the foam system was 1:1.5, and the total injection rate of the foam system and $CO_2$ was 2 mL/min. The liquid paraffin recovery factors under the injection amounts of 0.5 PV and 1.0 PV of the foam system were recorded to be 49% and 54% respectively, increasing the recovery factors by 3% and 8%. When the injection amount of the foam system was 1.0 PV, the apparent viscosity of the foam formed in the rock core was 3 mPa·s.

Example 7

The long-chain hydrocarbyl amine 1A pH-switching surfactant prepared in Example 1 was used.

Preparation of a Viscoelastic Foam System:

At normal temperature and at atmospheric pressure, 0.5 g of the long-chain hydrocarbyl amine 1A pH-switch surfactant and 0.1 g of sodium decyl sulfonate (TCI) were added into a saline with a mineralization degree of 50 g/L, and mixed to obtain 100 g of a viscoelastic foam system.

At normal temperature, the viscosity of the viscoelastic foam system could reach 3 mPa·s after saturation with 0.1 MPa $CO_2$. The solution surface of the carbon dioxide/foam system was tested with an interfacial rheometer to show an elasticity modulus of 39 mN/m, a viscosity module of 19 mN/m, and a phase angle of 26°.

Oil Displacement Experiment with the Viscoelastic Foam System:

A sample of rock core was vacuumized and weighed, then saturated with water and weighed. The pore volume PV was calculated based on the weight difference to be 47.9 mL. The water phase permeability k was determined to be 1048 mD. It was then saturated with liquid paraffin (analytical grade, obtained from Sinopharm Group) until no water flowed out, and then the rock core was placed for 1 month to be aged. The aged core was displaced with a saline with a mineralization degree of 50 g/L until no liquid paraffin flowed out, and the water drive recovery factor was recorded, which was 50%. Then, the aged rock core was displaced by injecting the viscoelastic foam system in Example 1 and $CO_2$ together. The volume flow rate ratio of $CO_2$ to the viscoelastic foam system was 1:2, and the total injection rate of the viscoelastic foam system and $CO_2$ was 2 mL/min. The liquid paraffin recovery factors under the injection amounts of 0.5 PV and 1.0 PV of the viscoelastic foam system were recorded to be 67% and 77% respectively, increasing the recovery factors by 17% and 27%. When the injection amount of the viscoelastic foam system was 1.0 PV, the apparent viscosity of the foam formed in the rock core was 301 mPa·s.

It can be seen from Example 1 and Example 7 that the long-chain hydrocarbyl amine prepared from different fatty acids mixed in the viscoelastic foam system had a better effect on improving the recovery factor than the long-chain hydrocarbyl amine prepared from a single fatty acid. In the present invention, after mixing, the recovery factor could be increased by 10% compared with the long-chain hydrocarbyl amine prepared from a single $C_{12}$ fatty acid.

It could be seen from Examples 1-7 and Comparative Examples 1-8 that after the viscoelastic foam system of the present invention met the acidic gas, the interaction between the pH-switch surfactant and the hydrocarbyl anionic surfactant is enhanced, the viscosity increased, and the formed foam had better stability and plugging performance. When the viscoelastic foam system was injected at 1.0 PV, the apparent viscosity of the foam formed in the rock core was ≥270 mPa·s, which could increase the recovery factor by more than 20%, and the long-chain hydrocarbyl amine improved the salt tolerance of the single anionic surfactant, so that the applicable mineralization range of the system was increased to 10-200 g/L.

The invention claimed is:

1. A viscoelastic foam system for an acidic gas switch, comprising a pH-switch surfactant, and a hydrocarbyl anionic surfactant and water, wherein the pH-switch surfactant is at least one of long-chain hydrocarbyl amines selected from compounds of formula (1), formula (Ia), formula (Ib), and formula (Ic):

(I)

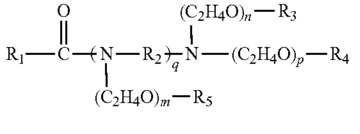

(Ia)

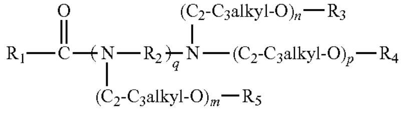

-continued (Ib)

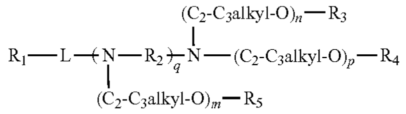

(Ic)

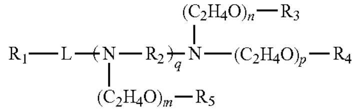

wherein $R_1$ is each independently selected from $C_{11}$-$C_{24}$ aliphatic hydrocarbyls;

$R_2$ is each independently selected from $C_1$-$C_5$ aliphatic hydrocarbyls;

$R_3$, $R_4$ and $R_5$ are each independently selected from H, $C_1$-$C_3$ aliphatic hydrocarbyls, and substituted $C_1$-$C_3$ aliphatic hydrocarbyls;

m+n+p is 1-30, q is 1 or 2; and

L is a bivalent linking group selected from —CO—, —CO—NH—, —CO—NH—CO—, —CO—NH—COO—, —CO—NH—OCO—, —COO—, —COO—NH—, —COO—NH—CO—, —COO—NH—COO—, —NHCO—, —NHCONH—, —NHCOO—, —NHOCO—, —OCONH—, —OCO—NH—CO—, —OCO—NH—OCO—, —OCOO—, —O—$SO_2$—, —$SO_2$—, and —O—.

2. The viscoelastic foam system according to claim 1, wherein the pH-switch surfactant is at least two of the long-chain hydrocarbyl amines selected from compounds of formula (1), formula (Ia), formula (Ib), and formula (Ic).

3. The viscoelastic foam system according to claim 1, wherein $R_1$ is selected from $C_{11}$-$C_{20}$ aliphatic hydrocarbyls; $R_2$ is selected from $C_1$-$C_3$ aliphatic hydrocarbyls; $R_3$, $R_4$ and $R_5$ are each independently selected from H and $C_1$-$C_3$ aliphatic hydrocarbyls; and m+n+p is 1-6.

4. The viscoelastic foam system according to claim 1, wherein $R_1$ is selected from $C_{11}$-$C_{20}$ aliphatic hydrocarbyls; $R_2$ is selected from $C_1$-$C_3$ aliphatic hydrocarbyl; and $R_3$, $R_4$ and $R_5$ are each independently selected from $C_1$-$C_3$ aliphatic hydrocarbyls.

5. The viscoelastic foam system according to claim 1, wherein $R_1$ is selected from $C_{11}$-$C_{24}$ aliphatic hydrocarbyls; $R_2$ is selected from $C_1$-$C_5$ aliphatic hydrocarbyls; and $R_3$, $R_4$ and $R_5$ are each independently selected from H, aliphatic $C_1$-$C_3$ hydrocarbyls, and substituted aliphatic $C_1$-$C_3$ hydrocarbyls, with the proviso that at least one of $R_3$, $R_4$, and $R_5$ is H.

6. The viscoelastic foam system according to claim 1, wherein the hydrocarbyl anionic surfactant is at least one selected from alkyl carboxylate salt, alkyl sulfate salt, alkyl sulfonate salt, and alkene sulfonate salt; wherein the carbon atom number of the alkyl is 1-20; the carbon atom number of the alkene sulfonate salt is 10-20;

the water is a mineral-containing water;

the viscoelastic foam system has 0.2-1 wt % of the pH-switch surfactant, 0.05-0.3 wt % of the hydrocarbyl anionic surfactant, and a mass ratio of the pH-switch surfactant to the hydrocarbyl anionic surfactant is 1:(0.05-15).

7. The viscoelastic foam system according to claim 6, wherein:

the water is at least one of tap water, oil and gas field stratum injection water, and water oil and gas field injection water;

the viscoelastic foam system has 0.3-0.6 wt % of the pH-switch surfactant, and 0.1-0.2 wt % of the hydrocarbyl anionic surfactant; and the mass ratio of the pH-switch surfactant to the hydrocarbyl anionic surfactant is 1:0.1 to 1:3.

8. A combination product for in-situ foam formation, comprising:

a pH-switch surfactant package containing a pH-switch surfactant; or a hydrocarbyl anionic surfactant package, containing a hydrocarbyl anionic surfactant;

wherein the pH-switch surfactant and the hydrocarbyl anionic surfactant are according to claim 6; and the combination product further comprises an acidic material package comprising an acidic material, wherein the acidic material is an acidic liquid or an acidic gas, the acidic gas is present in the form of compressed gas, and the pressure of the acidic liquid or acidic gas in the acidic material package is 0.1-30 MPaG.

9. The combination product for in-situ foam formation according to claim 8, wherein:

the acidic material in the acidic material package is $CO_2$.

10. A method for oil recovery, comprising: injecting the combination product for in-situ foam formation according to claim 8, wherein the oil reservoir has a mineralization degree of 10-200 g/L, and the foam formed from the combination product has an apparent viscosity of 200-400 mPa·s.

11. The viscoelastic foam system according to claim 6, wherein:

the hydrocarbyl anionic surfactant is selected from alkyl carboxylate salt, alkyl sulfate salt, alkyl sulfonate salt, and alkene sulfonate salt; the carbon atom number of the alkyl is 1-12; the carbon atom number of the alkene sulfonate salt is 10-20;

the water is a salt water with a mineralization range of 10-200 g/L;

the viscoelastic foam system has 0.3-0.6 wt % of the pH-switch surfactant and 0.1-0.2 wt % of the hydrocarbyl anionic surfactant; and the mass ratio of the pH-switch surfactant to the hydrocarbyl anionic surfactant is 1:0.1 to 1:3.

12. A method for improving a recovery factor, comprising injecting the viscoelastic foam system according to claim 1 and an acidic gas alternately or together into a porous medium containing crude oil, forming foam in situ in the porous medium, thereby improving the recovery factor.

13. The method according to claim 12, wherein the acidic gas comprises $CO_2$, $H_2S$, or both.

14. The method according to claim 12, wherein the injecting is performed at a volume flow rate ratio of the acidic gas to the viscoelastic foam system of 1:0.1 to 1:2.

15. A method for recovering oil from an oil reservoir, comprising injecting the viscoelastic foam system according to claim 1 into the oil reservoir, wherein the oil reservoir has a mineralization degree of 10-200 g/L.

16. A combination product for in-situ foam formation, comprising:

a viscoelastic foam system package; and an acidic material package;

wherein the viscoelastic foam system package contains the viscoelastic foam system according to claim 1, and the acidic material package contains an acidic material that is an acidic liquid or an acidic gas, the acidic gas is present in the form of compressed gas, and the pressure of the acidic liquid or acidic gas in the acidic material package is 0.1-30 MPaG.

17. The combination product for in-situ foam formation according to claim 16, comprising:

a means for controlling the viscoelastic foam system package to output the viscoelastic foam system; and a means for controlling the acidic material package to output the acidic material, so that the ratio of the volume flow rate of the acidic material output from the acidic material package to the volume flow rate of the viscoelastic foam system output from the viscoelastic foam system package is 1:0.1 to 1:10 , wherein the sum of the volume flow rate of the acidic material output from the acidic material package and the volume flow rate of the viscoelastic foam system output from the viscoelastic foam system package is 0.2-200 mL/min, and/or, the pressure of the acidic material output from the acidic material package is 0.1-30 MPaG; the pressure of the viscoelastic foam system output from the viscoelastic foam system package is 0.1-30 MPaG; and wherein the acidic liquid comprises one or more selected from carbonic acid, acetic acid, propionic acid, and butyric acid, and the acidic gas comprises $CO_2$, $H_2S$, or both.

18. The combination product for in-situ foam formation according to claim 17, wherein:

the acidic material in the acidic material package is $CO_2$, a system obtained by saturating the viscoelastic foam system in the viscoelastic foam system package with the acidic material in the acidic material package at normal temperature and 0.1 MPa has a viscosity of 3-30 mPa·s, the system has a solution surface having an elasticity modulus of at least 30 mN/m, a viscosity module of at least 10 mN/m, and a phase angle of 10-30°.

19. A method for recovering oil from an oil reservoir, comprising injecting the combination product for in-situ foam formation according to claim 16 in the oil recovery, wherein the oil reservoir has a mineralization degree of 10-200 g/L, and foam formed from the combination product has an apparent viscosity of 200-400 mPa·s.

* * * * *